(12) United States Patent
Ho

(10) Patent No.: US 9,459,666 B2
(45) Date of Patent: Oct. 4, 2016

(54) TOUCH PANEL

(71) Applicant: HengHao Technology Co. LTD, Taoyuan County (TW)

(72) Inventor: Ming-Hsien Ho, Taoyuan County (TW)

(73) Assignee: Henghao Technology Co. Ltd., Pingzhen, Taoyuan County (TW)

( * ) Notice: Subject to any disclaimer, the term of this patent is extended or adjusted under 35 U.S.C. 154(b) by 90 days.

(21) Appl. No.: 14/096,451

(22) Filed: Dec. 4, 2013

(65) Prior Publication Data

US 2015/0103260 A1    Apr. 16, 2015

(30) Foreign Application Priority Data

Oct. 11, 2013   (TW) .............................. 102136647 A

(51) Int. Cl.
*G06F 1/16*       (2006.01)
*G06F 3/044*      (2006.01)

(52) U.S. Cl.
CPC ............. *G06F 1/1692* (2013.01); *G06F 3/044* (2013.01)

(58) Field of Classification Search
None
See application file for complete search history.

(56) References Cited

U.S. PATENT DOCUMENTS

| 9,030,440 | B2* | 5/2015 | Pope ...................... G06F 3/044 345/174 |
| 2014/0159067 | A1* | 6/2014 | Sakariya et al. ................ 257/88 |
| 2015/0077649 | A1* | 3/2015 | Lee ................................ 349/12 |

FOREIGN PATENT DOCUMENTS

| KR | 200458876 Y1 | 3/2012 |
| KR | 20120072940 A | 7/2012 |

OTHER PUBLICATIONS

Office Action Dated Mar. 5, 2015 in corresponding Korean Patent Application No. 20-2014-0000261.

* cited by examiner

*Primary Examiner* — Kenneth B Lee, Jr.
(74) *Attorney, Agent, or Firm* — Donald E. Stout; Stout, Uxa & Buyan, LLP

(57) ABSTRACT

A touch panel includes a transparent substrate, a touch sensor layer disposed under the transparent substrate and a ground ring disposed on, above or under a black matrix. The ground ring is also disposed around the sidewall of the touch sensor layer.

15 Claims, 4 Drawing Sheets

TOUCH PANEL

BACKGROUND OF THE INVENTION

1. Field of the Invention

The present invention generally relates to touch panels, and more particularly to a touch panel with a ground ring design that can reduce the area of the rim of the touch panel.

2. Description of the Related Art

Touch displays combining sensor and display technologies to form input/output modules such as touch panels are commonly used in electronic appliances, such has portable and handheld electronic devices.

The capacitive type touch panel is the most commonly used touch panel, using capacitive coupling effects to detect touch location. When conductive pointers such as a user's finger(s) approach or touch the surface of the capacitive touch panel, capacitance(s) corresponding to the touch location(s) will be altered and thus the touch location(s) can be detected.

FIGS. 1A and 1B respectively show a cross-sectional view and a top view of a touch panel. The structure of FIG. 1A exhibits a glass substrate 2, a black matrix 8 on the peripheral area of the lower surface of the glass substrate 2 and a touch sensor layer 4 disposed under the glass substrate 2 and the black matrix 8. The touch sensor layer 4 includes an electrode layer to detect touch location. A trace 11, a grounding ring 12, a first overcoat layer 15 and bridges 17 exist on the lower surface of the touch sensor layer 4. A second overcoat layer 6 is configured to cover the touch sensor layer 4, the trace 11, the grounding ring 12 and the first overcoat layer 15. The trace 11 and the grounding ring 12 are located beneath the black matrix 8.

The layout of FIG. 1B corresponds to an electrostatic discharge protection design utilizing the grounding ring 12, surrounding electrodes 14 and 16, and conductive lines 18 on the touch panel. FIG. 1B also shows the bridges 17 connecting adjacent pairs of electrodes 16.

However, since the size of touch panel is limited, in order to increase the touch control area and the display area on the touch panel, the width of the black matrix 8 or the width of the rim of the touch panel must be reduced as far as possible, to obtain a narrower rim. Thus, while the size of touch panel maintains unchanged, the outline dimension can be reduced. Nevertheless, since the trace 11 and the grounding ring 12 are located just beneath the black matrix 8, attempts at decreasing the width of the black matrix 8 are restricted.

Therefore, there is a need to propose an innovative touch panel to improve the shortcomings of the traditional touch panel.

SUMMARY OF THE INVENTION

One object of the invention is to provide a touch panel with a ground ring design that can reduce the area of the rim of the touch panel in order to increase the touch control area and the display area on the touch panel.

In one embodiment of the disclosure, the invention provides a touch panel comprising a transparent substrate, a touch sensor layer located on a lower surface of the transparent substrate and a ground ring located on a side of the touch sensor layer and surrounding the touch sensor layer.

In another embodiment of the invention, the invention provides a touch panel comprising a transparent substrate, a black matrix located on a lower surface of the transparent substrate, a touch sensor layer located on a lower surface of the transparent substrate and a lower surface of the black matrix, and a ground ring located above or under the black matrix and surrounding the touch sensor layer.

DETAILED DESCRIPTION OF THE INVENTION

Figure 1A:
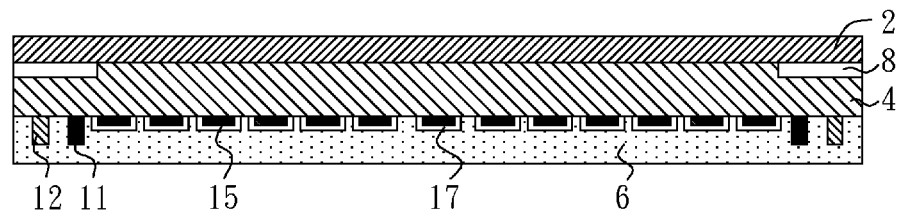
FIGS. 1A and 1B show a cross sectional view and a top view, respectively, of a touch panel.
Figure 1B:
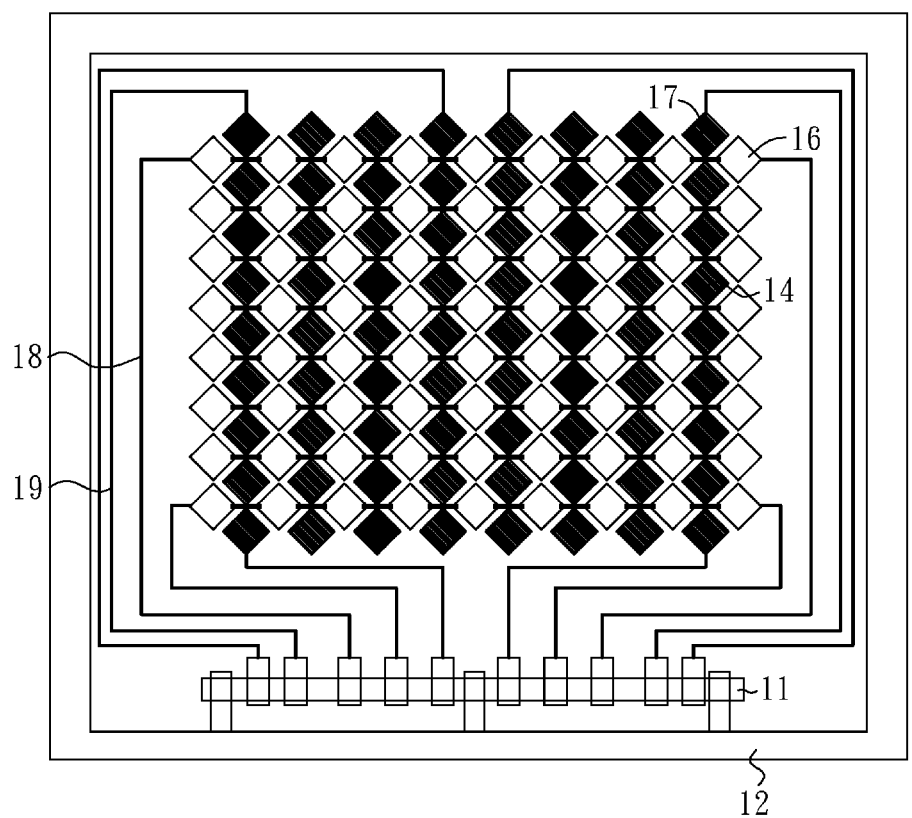

Various example embodiments of the present invention will now be described more fully with reference to the accompanying drawings in which some example embodiments of the invention are shown. In the drawings, the size of every component may be exaggerated for clarity.

Detailed illustrative embodiments of the present invention are disclosed herein. However, specific structural and functional details disclosed herein are merely representative for purposes of describing example embodiments of the present invention. This invention may, however, be embodied in many alternate forms and should not be construed as limited to only the embodiments set forth herein.

Figure 2A:
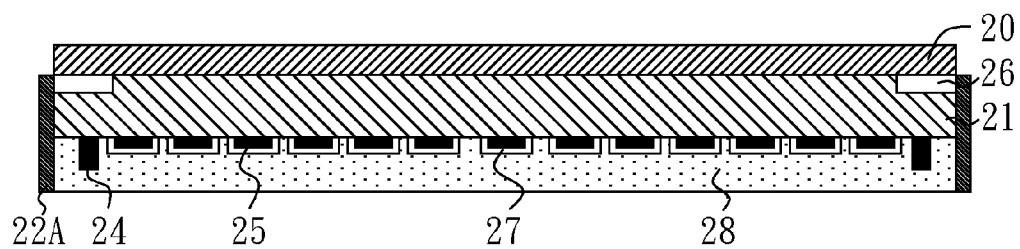
FIGS. 2A to 2F show cross sectional views of touch panels according to six embodiments of the invention.
Figure 2B:
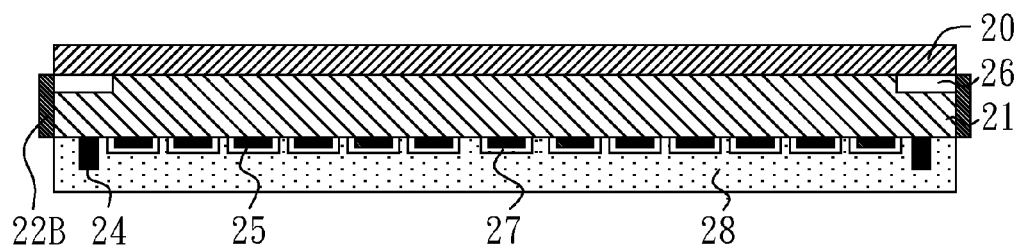
Figure 2C:
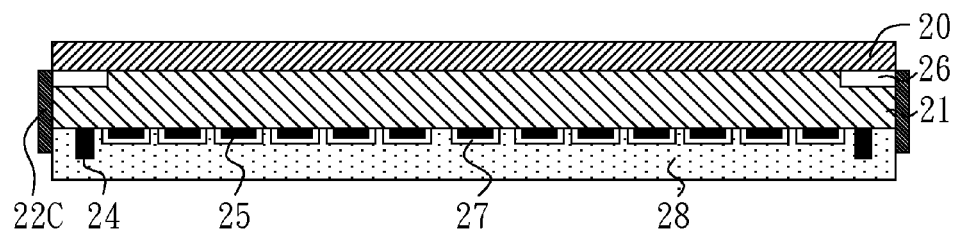

Turning to FIGS. 2A to 2C, cross sectional views of touch panels are elucidated according to three embodiments of the invention. The touch panels of these embodiments comprise, but are not limited to, one glass substrate/solution (OGS) or one film substrate/solution (OFS) types of touch panels.

As shown in FIG. 2A, a black matrix 26 is located on the peripheral area of the lower surface of a transparent substrate 20 of a touch panel, and a touch sensor layer 21 is located on the lower surfaces of the transparent substrate 20 and the black matrix 26. The touch sensor layer 21 includes an electrode layer to detect the touch location. A trace 24, a first overcoat layer 25 and bridges 27 are provided on the lower surface of the touch sensor layer 21. A second overcoat layer 28 is configured to cover the touch sensor layer 21, the trace 24, and the first overcoat layer 25. The trace 24 is located beneath the black matrix 26. A grounding ring 22A is located on sides of the touch panel. In a preferred embodiment; the grounding ring 22A is configured to surround the touch panel and on the sides of the black matrix 26, the touch sensor layer 21 and the second overcoat layer 28, and to match with the system of the touch panel.

In the embodiment shown in FIG. 2B, a grounding ring 22B is configured to surround the touch panel and reside by, e.g., on, sides of the black matrix 26 and the touch sensor layer 21. In the embodiment shown in FIG. 2C, a grounding ring 22C is configured to surround the touch panel and be disposed on the sides of the black matrix 26, the touch sensor layer 21 and a partial side of the second overcoat layer 28. It is noted that the grounding ring is not limited to being located on or by the mentioned sides and may be, for instance, on or at a side(s) of either one or two of the black matrix 26, the touch sensor layer 21 and the second overcoat layer 28 provided that the ground ring should surround the touch sensor layer and the trace to block external electrostatic charges.

The material of the transparent substrate 20 comprises insulating materials, such as glass, polycarbonate (PC), polyethylene terephthalate (PET), polyethylene (PE), PVC (PVC), polypropylene (PP), polystyrene (PS), poly methyl methacrylate (PMMA) or cyclic olefin polymer (COC).

The touch sensor layer 21 comprises a structure of conductive material. The conductive material comprises indium tin oxide (ITO), indium zinc oxide (IZO), Al-doped ZnO (AZO) or antimony tin oxide (ATO), nano-silver or nano-copper, etc.

The grounding rings 22A, 22B and 22C comprise, but are not limited to, conductive materials including indium tin oxide, indium zinc oxide, aluminum zinc oxide, or antimony tin oxide formed on the side of the touch panel and around the touch panel by sputtering or printing.

Figure 2D:
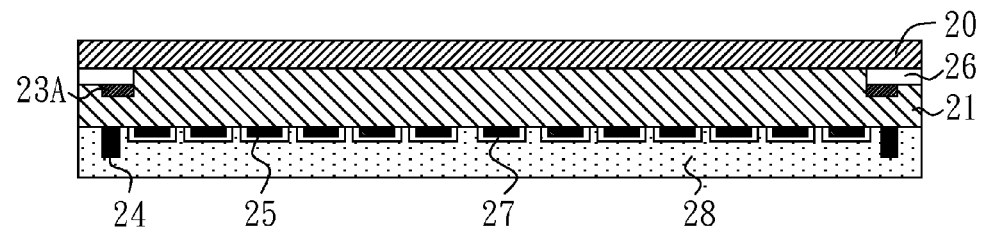
Figure 2E:
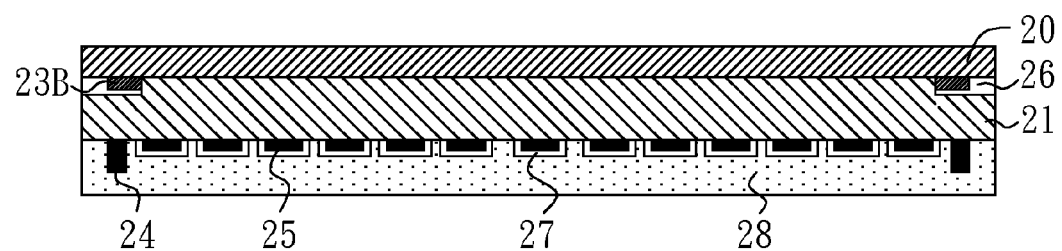
Figure 2F:
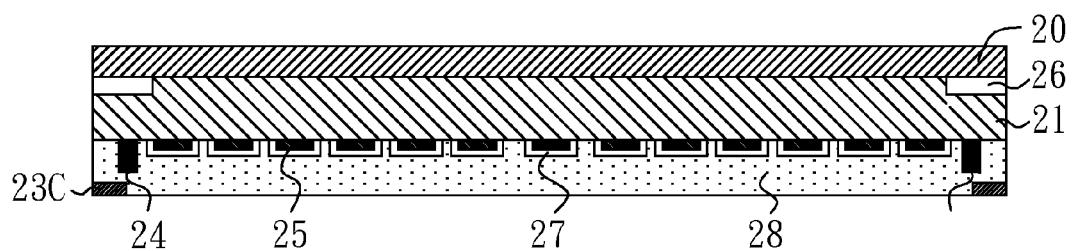

FIGS. 2D to 2F show cross sectional views of touch panels according to another three embodiments of the invention. The touch panels of these embodiments comprise, but are not limited to, OGS or OFS types of touch panels.

As shown in FIG. 2D, the black matrix 26 is located on the peripheral area of the lower surface of a transparent substrate 20 of a touch panel, and the touch sensor layer 21 is located on the lower surfaces of the transparent substrate 20 and the black matrix 26. A grounding ring 23A is located in the touch sensor layer 21 and under the black matrix 26 or on the lower surface of the black matrix 26. The touch sensor layer 21 includes an electrode layer to detect the touch location. The grounding ring 23A can be located on any position in the touch sensor layer 21 and under the black matrix 26. The trace 24, the first overcoat layer 25 and the bridges 27 are on the lower surface of the touch sensor layer 21. A second overcoat layer 28 is configured to cover the touch sensor layer 21, the trace 24, and the first overcoat layer 25. The trace 24 is located beneath the black matrix 26.

In the embodiment shown in FIG. 2E, a grounding ring 23B is configured to be located under the transparent substrate 20 or on the lower surface of the transparent substrate 20 or above the black matrix 26. In the embodiment shown in FIG. 2F, a grounding ring 23C is configured to be located under the black matrix 26 and the second overcoat layer 28 or the lower surface of the second overcoat layer 28 or in the second overcoat layer 28.

The grounding ring 23A comprises, but is not limited to, conductive materials including indium tin oxide, indium zinc oxide, aluminum zinc oxide, or antimony tin oxide. The grounding ring 23A can be formed, for example, without limitation, in the touch sensor layer 21 and under the black matrix 26 and surrounding the electrode layer.

The grounding ring 23B comprises, but is not limited to, conductive materials including indium tin oxide, indium zinc oxide, aluminum zinc oxide, or antimony tin oxide. The grounding ring 23B can be, but is not limited to being, formed on the lower surface of the transparent substrate 20 and above the black matrix 26 and surrounding the electrode layer.

The grounding ring 23C comprises, but is not limited to, conductive materials including indium tin oxide, indium zinc oxide, aluminum zinc oxide, or antimony tin oxide. The grounding ring 23C can be formed, by way of a non-limiting example, in the second overcoat layer 28 or under the second overcoat layer 28 or on the lower surface of the second overcoat layer 28 and under the black matrix 26 and to surround the electrode layer.

Although specific embodiments of the present invention have been described, it will be understood by those of skill in the art that there are other embodiments that may be equivalent to the described embodiments. Accordingly, it is to be understood that the invention is not to be limited by the specific illustrated embodiments, but only by the scope of the appended claims.

What is claimed is:

1. A touch panel, comprising:
   a transparent substrate;
   a touch sensor layer located on a lower surface of the transparent substrate;
   a ground ring located and attached onto a sidewall of the touch sensor layer and surrounding the touch sensor layer;
   a black matrix located on the lower surface of the transparent substrate; and
   an over coat layer covering the touch sensor layer, wherein the ground ring is located and attached onto the sidewall of the touch sensor layer and a sidewall of the black matrix and a sidewall of the over coat layer, and surrounds the touch sensor layer so as to reduce an area of an rim of the touch panel to increase a touch control area and a display area on the touch panel.

2. The touch panel of claim 1, wherein the touch sensor layer is located on the lower surface of the transparent substrate and a lower surface of the black matrix.

3. The touch panel of claim 1, wherein the transparent substrate comprises at least one of glass, polycarbonate (PC), polyethylene terephthalate (PET), polyethylene (PE), PVC (PVC), polypropylene (PP), polystyrene (PS), poly methyl methacrylate (PMMA) or cyclic olefin polymer (COC).

4. The touch panel of claim 1, wherein the touch sensor layer comprises a structure of conductive material, the conductive material comprises indium tin oxide (ITO), indium zinc oxide (IZO), Al-doped ZnO (AZO) or antimony tin oxide (ATO), nano-silver or nano-copper.

5. The touch panel of claim 1, wherein the grounding ring comprises indium tin oxide, indium zinc oxide, aluminum zinc oxide, or antimony tin oxide.

6. The touch panel of claim 5, wherein the grounding ring is formed on the sidewall of the touch panel by sputtering or printing.

7. The touch panel of claim 1, wherein the touch panel comprises a one glass substrate touch panel or a one film substrate touch panel.

8. A touch panel, comprising:
   a transparent substrate;
   a black matrix located on a lower surface of the transparent substrate;
   a touch sensor layer located on the lower surface of the transparent substrate and a lower surface of the black matrix; and
   a ground ring located above or under the black matrix and surrounding the touch sensor layer so as to reduce an area of an rim of the touch panel to increase a touch control area and a display area on the touch panel.

9. The touch panel of claim 8 further comprising an over coat layer covering the touch sensor layer.

10. The touch panel of claim 8, wherein the grounding ring comprises indium tin oxide, indium zinc oxide, aluminum zinc oxide, or antimony tin oxide.

11. The touch panel of claim 8, wherein the grounding ring is located on lower surface of the black matrix and surrounds the touch sensor layer.

12. The touch panel of claim 8, wherein the grounding ring is located under the transparent substrate or on the lower surface of the transparent substrate and above the black matrix and surrounds the touch sensor layer.

13. The touch panel of claim 9, wherein the grounding ring is located under the black matrix and the over coat layer or on a lower surface of the over coat layer.

14. The touch panel of claim 9, wherein the grounding ring is located under the black matrix and in the over coat layer.

15. The touch panel of claim 8, wherein the touch panel comprises a one glass substrate touch panel or a one film substrate touch panel.

\* \* \* \* \*